(12) United States Patent
Wilson et al.

(10) Patent No.: US 7,324,757 B2
(45) Date of Patent: Jan. 29, 2008

(54) USB COMMUNICATION TRANSCEIVER USING OPTICAL LINK

(75) Inventors: Richard C Wilson, Woodbridge (GB); Michael S Bull, Balsham (GB)

(73) Assignee: British Telecommunications public limited company, London (GB)

( * ) Notice: Subject to any disclaimer, the term of this patent is extended or adjusted under 35 U.S.C. 154(b) by 690 days.

(21) Appl. No.: 10/468,779

(22) PCT Filed: Mar. 7, 2002

(86) PCT No.: PCT/GB02/01037

§ 371 (c)(1),
(2), (4) Date: Aug. 21, 2003

(87) PCT Pub. No.: WO02/073836

PCT Pub. Date: Sep. 19, 2002

(65) Prior Publication Data

US 2004/0072540 A1  Apr. 15, 2004

(30) Foreign Application Priority Data

Mar. 14, 2001 (EP) .................. 01302366

(51) Int. Cl.
*H04B 10/04* (2006.01)
(52) U.S. Cl. .............. 398/116; 398/185; 398/201
(58) Field of Classification Search .......... 398/118, 398/138, 135–152, 164, 107, 115–117, 130, 398/185, 201, 106
See application file for complete search history.

(56) References Cited

U.S. PATENT DOCUMENTS

| 6,098,174 | A | 8/2000 | Baron et al. |
| 6,446,867 | B1 * | 9/2002 | Sanchez ................... 235/454 |
| 6,457,640 | B2 * | 10/2002 | Ramachandran et al. ... 235/379 |
| 6,481,013 | B1 * | 11/2002 | Dinwiddie et al. .......... 725/80 |
| 6,594,646 | B1 * | 7/2003 | Okayama et al. ............ 705/51 |

FOREIGN PATENT DOCUMENTS

| JP | 2000187537 | * | 7/2000 |
| WO | WO 99/31814 | | 6/1999 |
| WO | WO 00/01138 | | 1/2000 |
| WO | WO 00/28689 | | 5/2000 |

OTHER PUBLICATIONS

KC Technology et al, "IrDA-USB Controller" XP002174623, 1999.
Iacobelli et al, "Infrared Dongle Interface" Infrared Data Association, 'Online! Apr. 26, 1999, pp. 01-15, XP002173624.
"Red-M and Extended Systems", Extended Systems Beyond Connected™, 1997, http://www.extendedsystems.com/ESI/company+info/partners/red-m.htm.

* cited by examiner

*Primary Examiner*—Leslie Pascal
(74) *Attorney, Agent, or Firm*—Nixon & Vanderhye P.C.

(57) ABSTRACT

An optical version of USB is provided to enable PDAs and digital cameras to download data and media files to remote network servers. The PDA is plugged into an optical transceiver that communicates with a complementary transceiver located in a network terminal (for example a payphone) that is in communication with the network server.

32 Claims, 3 Drawing Sheets

USB COMMUNICATION TRANSCEIVER USING OPTICAL LINK

This application is the U.S. national phase of international application PCT/GB02/01037 filed 7 Mar. 2002 which designated the U.S.

BACKGROUND

1. Technical Field

The invention relates to optical communications links, in particular optical free-space communications links for transmission over short distances.

2. Related Art

Recent advances in consumer electronics have led to the development of many different devices such as digital cameras, personal digital organisers, MP3 players, etc that are capable of exchanging data directly with personal computers (PCs) or over communications networks, for example, downloading data from World Wide Web (WWW) servers. Many of these use connectors complying with the USB standard.

A USB connection is a half-duplex communication, carried over two data wires. An additional two wires carry power. The two data wires do not have a data flow direction associated with them, as the RS232 serial communication does, but the two wires give a differential signal whose relative polarity defines a logic zero or one. Hence, the data must be sent in a half-duplex fashion to prevent collisions on the connection, which of course would lead to data corruption.

Users of devices connected by a USB connection can use a connection to a PC (personal computer) or to a communications network to transfer data to or from their device (for example transferring digital camera image files to a WWW server or synchronizing diary data held on a PDA (personal digital assistant) with that held on a PC). It is relatively easy for users to connect their devices to transfer data when in, for example, their home or their workplace where there is access to a communications network, for example using dial-up access over the PSTN (public switched telephone network) or access to a LAN (local area network)(with an Internet gateway.

Several multi-wire schemes are available such as the standard Printer Parallel Bus and the IEEE488 GPIB Bus, hard-wired serial schemes such as the RS232 Serial Bus, and optical serial schemes like the IrDA Optical Bus. These methods all require complex software control systems to allow data transfer across the link with no intervention from the systems whatsoever. Any error handling or flow control comes from the application software itself.

If users do not have such network access then the fallback option is to connect using a mobile communications network. Whilst this may be an acceptable choice when sending short emails or synchronising a diary from a PDA, the limited transmission capabilities (9.6 kb/s with a GSM mobile telephone network) make it impractical for exchanging larger quantities of data, for example uploading digital camera images or downloading music files when the respective devices may have memory card storage capacities of 256 MB or even greater (very much greater for devices having disk storage capabilities). Although GPRS and UMTS mobile communication networks promise to deliver greater transmission rates to mobile users they are not currently in use and it is not altogether clear what data transmission rates will be available to users in practice.

BRIEF SUMMARY

The present invention seeks to provide a means of sending and receiving data across a link without the complexity of conversion to one of the multichannel systems discussed above.

According to a first aspect of the invention there is provided an optical transceiver, the transceiver comprising means enabling an associated electronic device to, in use, transmit and receive data signals in the USB two channel format, and means to directly modulate the received USB-format signals onto an optical carrier.

The use of an optical connection allows a publicly accessible host terminal to provide connection to user equipment without making it vulnerable to damage, for example from bent electrical pins or water ingress. Because the USB format carries two parallel channels some form of docking port is desirable to ensure correct alignment of the optical interfaces to avoid interference between the channels, or from external light sources. However, because the terminals in the port are optical they are much more easily protected from accidental or malicious damage than electrical terminals could be.

In an electrical USB connection two way traffic is possible over a single wire pair, but in an optical arrangement separate outward and return paths are required. The need for separate paths arises because an optical link by definition can only work in one direction—there is an emitter and a detector, and they must be physically separated to some extent to prevent self-detection. Therefore, each of the two data wires has to have an emitter and a detector to allow bi-directional communication. In its simplest form the two data wires of the USB system could be replaced by two pairs of optical links that emulated the hard wired system.

It is desirable to have such a link operate in a manner that allows transparent operation of the link as if a cable was still attached directly. However, the need to protect the circuitry from locking up means that the signal would become unacceptably degraded. Locking up is illustrated in FIG. 4, and arises because without any direction information each optical pair 101, 311; 301, 111 has to be hard wired in reverse parallel, as shown in FIG. 4, which leads to a latching situation in which a signal from an input 191, for transmission over an optical path 101, 311 to an output 391, can loop through the return path 301, 111 one or more times. To prevent this "latching", the transceiver is preferably arranged for time division duplex operation with a co-operating transceiver, that is to say that one transceiver is in a transmit only mode when the other is in a receive only mode. This requires a method of detecting the intended direction of data flow in advance of that flow itself. If this 'foresight' is not achieved then the data would start to flow before the link is turned around, thus losing some of the data and corrupting the communication. To co-ordinate the operation of two such transceivers, a first one preferably comprises means for transmitting a control signal for controlling the operation of a the co-operating transceiver, means for operating in receive mode for a predetermined period after transmission of the control signal, means for detecting signals received from the co-operating transceiver, and means for switching to transmit mode if no such signals are detected. The co-operating transceiver, and means for putting the transceiver into transmit mode in response to the control signal.

In the USB system the data rate at which the connection is to be operated is determined by detection of a physical configuration of the user terminal, specifically by detecting to which signalling wire a pull-up resistor is connected. This information can be carried across the optical link by providing, in one of the transceivers, means for detecting this configuration, means for generating data in accordance with the detected configuration, means for detecting an idle period in the transmitted and received data signals, and means for transmitting the generated configuration data over the optical link during said idle period. The corresponding transceiver comprises means for detecting the idle periods in the transmitted and received data signals, means for receiving configuration data over the optical link during said idle periods, and means for configuring the electronic device according to the configuration data, specifically by generating an electrical signal replicating that which would have been detected by the terminal had it been connected directly to the user terminal.

Preferably a first transceiver comprises detection means for detecting an alert signal indicative that a co-operating transceiver is present, whilst the co-operating transceiver comprises transmission means for transmitting an alert signal to the first transceiver indicative of its presence. This arrangement ensures that spurious behavior is not caused by other light sources when no co-operating transceiver is present.

The transmission means are preferably pulsed light emitting diodes, and the detection means are preferably optical sensors. In a preferred arrangement, each transceiver comprises three pairs of optical transmitters and sensors, wherein two of the pairs are used for duplex operation in the two-channel USB format, and the third pair is used for exchange of the alert and control signals The invention also extends to a communications terminal comprising a transceiver of the type described above, which may be connected to a storage device by a communications network, and may include means for processing payment for use of the terminal, such as a cash or credit card payment system. The co-operating transceiver may also be of the type described above, and may comprise means for connection to and disconnection from an associated electronic device. Such a connection may be a standard wired USB format connection, allowing wired equipment built to this standard to interface with the optical transceiver in the terminal by connecting a USB-to-optical interface device incorporating the transceiver according to the invention between them.

In the described embodiment, the transceiver connected to the electronic device generates the alert and configuration signals, and receives the control signal, whilst the co-operating transceiver connected to the communications network transmits the control signal, and responds to the alert signal and configuration signals. However, other permutations are possible within the scope of the invention.

BRIEF DESCRIPTION OF THE DRAWINGS

FIG. 4 shows a pair of non-optimal optical connectors, illustrating the problem of latching, and has already been discussed.

DETAILED DESCRIPTION OF EXEMPLARY EMBODIMENTS

Figure 1:
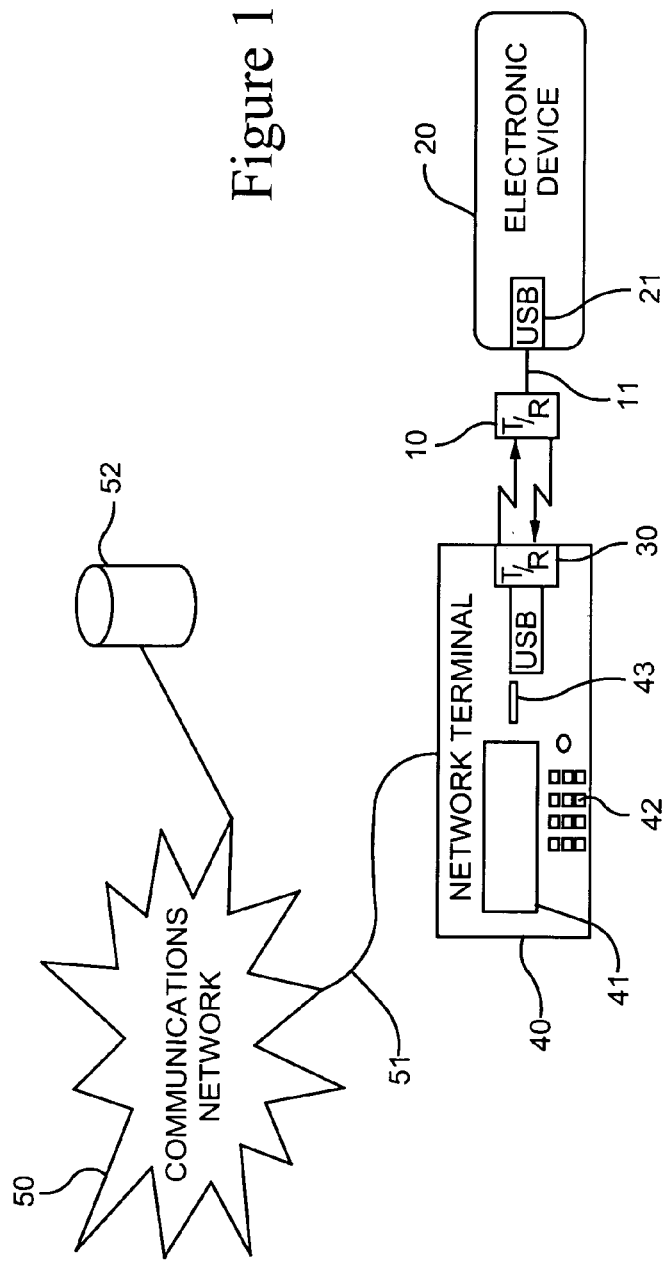
FIG. 1 shows a schematic depiction of an arrangement incorporating a device according to the present invention.

FIG. 1 shows an arrangement incorporating a device according to an exemplary embodiment of the present invention including an optical transceiver 10 (hereinafter referred to as the peripheral transceiver), an electronic device 20, and a communications network terminal 40 which incorporates a further optical transceiver 30 (hereinafter referred to as the host transceiver), the communications network terminal also being connected to a communications network 50. The optical peripheral transceiver 10 is connected to the electronic device 20 by a cable 11 which connects to a communications port 21 of the electronic device. The communications port 21 and the cable 11 are arranged according to the Universal Serial Bus (USB) communications link. Data transmission rates of up to 12 Mb/s are possible under the USB 1.1 specification, and the USB 2.0 specification envisages data rates of up to 480 Mb/s. USB ports have become ubiquitous in modem PCs, laptops and PDAs and are becoming common in devices such as digital cameras, MP3 players, etc.

The communications terminal 40 allows the user to make a connection to a desired information repository 52; for example a secure partition of the user's WWW server, so that images from a digital camera might be transferred to the server to allow further images to be taken with the camera, or downloading music files from a service such as myMP3.com or connecting to an email server, etc. The communications terminal 40 comprises a display screen 41, an input controller 42 (which may be a keyboard, mouse, trackball, or a touch screen facility incorporated in the screen 41) and a card reader 43 that enables a user to insert a credit card, smart card or other payment card. The communications terminal 40 may additionally comprise a mechanism for accepting coins, as is known from conventional payphones. The communications terminal 40 is connected to the communications network 50 by a communications link 51, with the communications network 50 being in communication with the internet such as a WWW server storage device (52). The communications link 51 may be a PSTN line, with the communications terminal 40 using a modem to communicate with an internet PoP (point of presence) but it is advantageous for the communications link 51 to have an increased data transmission capacity to facilitate rapid transfer of data to and from the electronic device 20, for example an ISDN or DSL connection or other high-speed connection. As an alternative the communications link 51 could be provided using a radio communications link or an optical fibre communications link. ADSL (asymmetric digital subscriber loop) could be used, although it is likely that there will be an approximately equal number of users who wish to upload data to a server as those who wish to download data from a server and an asymmetric transmission system would handicap one of these user groups. ADSL could be used to advantage if it were possible to re-initialise the ADSL connection such that the higher data rate connection could be aligned with the needs of the users.

When a user needs to transfer data to or from the electronic device 20 then the transceivers 10, 30 in the device 20 and terminal 40 are aligned, and the user makes sufficient payment to enable use of the system (the payment may cover, for example a session of limited duration, the transmission of a given volume of data or a single session without any such restriction). The user enters the address of the data repository to be accessed using the input controller 42 and initiates the transfer of data between the data repository 52 and the electronic device 20. The electronic device 20 transmits data via its connector 21 to the peripheral transceiver 10. The peripheral transceiver 10 converts the electrical USB signals into infra-red USB signals which are then transmitted through free-space to the host transceiver 30 in the terminal 40, at which point the infra-red USB signals are converted back into the electrical domain. The communications terminal 40 then transmits the data via the communications link 51 to the communications network 50, where the data is routed to the data repository 52. Data is routed from the data repository 52 to the electronic device 20 by the reverse route.

It may be necessary for the terminal 40 to use device-specific drivers in order to transmit data to and receive data from the electronic device. This can be achieved by a number of different methods. For example, the operator of the terminal 40 may decide only to support the most popular electronic devices and store the required drivers in the terminal 40, or on a server connected to a private network accessible by the terminal 40. Alternatively, the terminal 40 may download the drivers from the device 20, or from a remote network location which is identified by the device 20, such as the website of either the user or the device manufacturer, when the device begins communication with the terminal. This would ensure that the most up to date drivers are always used. As a further alternative the dynamic proxy server architecture proposed by Fry and Ghosh would allow the terminal to access and execute required device drivers as necessary.

Figure 2:
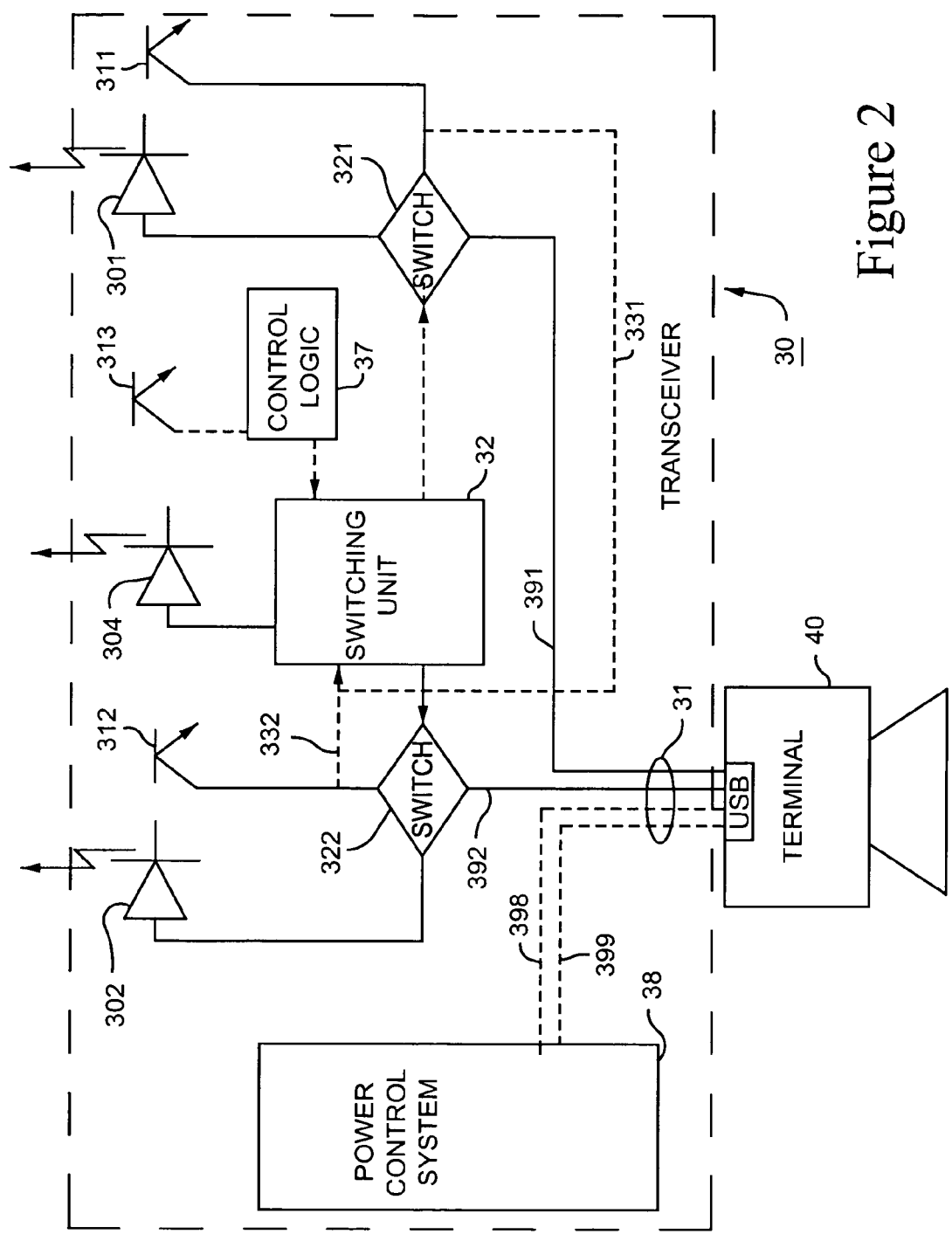
FIG. 2 shows a schematic depiction of the structure of a first transceiver suitable for use in the present invention.
Figure 3:
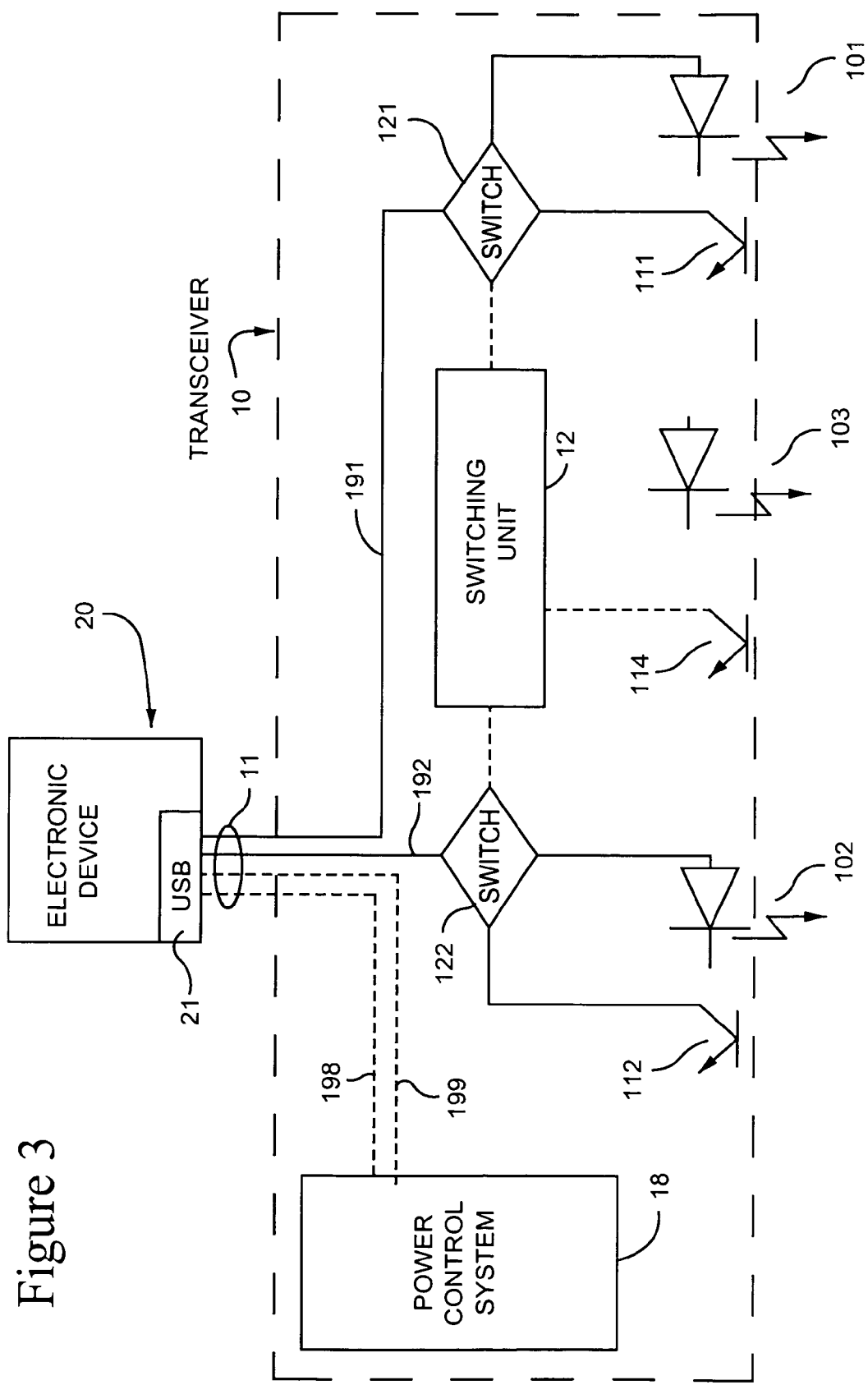
FIG. 3 shows a schematic depiction of the structure of a second transceiver suitable for use in the present invention, and complementary to the transceiver of FIG. 2.

In order to implement a preferred embodiment of the present invention, it is necessary to provide a transceiver that connects to an electronic device that can generate infra-red data signals from the electrical USB signals created by the electrical device and generate electrical USB signals from the infra-red data signals received from the terminal transceiver. It is also necessary to provide a complementary transceiver for use in the terminal. A pair of such transceivers 10, 30 are shown in FIGS. 2 and 3. The embodiment is arranged such that the terminal and peripheral operate as if connected directly together, in other words the device 20 and terminal 40 each co-operates with its respective transceiver 10, 30 in the same way that they would with each other if connected directly through the connection 11, 31, so neither the device 20 nor the terminal 40 require any modification.

Standard USB links 11, 31 are provided between the terminal 40 and device 20 to their respective transceivers 10, 30. The USB specification requires USB link 11, 31 cables to have two wires 198, 199; (398, 399) to carry electrical power and two wires 191, 192; (391, 392) to carry the data. The power connections 198, 199; 398, 399 provide power to the respective transceivers 10, 30 (and in particular the LEDs to be described later), through respective power control systems 18, 38, which will not be described in detail. There are of course no power connections across the infra-red link.

The data wires 198, 199, (398, 399) are both bi-directional. The data wires operate on a differential basis, that is to say, the two wires generally carry binary signals of opposite polarity, a logical "1" being indicated by a first data wire being "high" and the other data wire being "low", whilst for a logical "0" the first data wire is "low" and the second data wire is "high". Thus the data can be interpreted by examining the differential state of the wires. In addition to this, a valid state exists where both wires are held Low, and this is called a Single Ended Zero (SE0). Further formatting, known as Non Return to Zero Invert format (NRZI), and "bit-stuffing" are used to ensure that some activity happens on a regular basis, but for clarity purposes, everything that follows will assume that the NRZI encoding and bit stuffing do not exist, and all references to data will refer to the raw logic state of that data. The general transmission of data involves sending what are known as PACKETS, each preceded by a Start Of Packet (SOP) signal and terminated by an End Of Packet (EOP) signal. The SOP is purely the transition from the Idle state to a state known as the K-state. The EOP is signaled by the lines being put in the SE0 state for 2 bit times followed by a transition to a state known as the J-state for one bit time. The USB 1.1 specification allows for two data rates (low-speed at 1.5 Mb/s and high-speed at 12 Mb/s). In low speed mode the J-state has a differential of zero, and the K state has a differential of 1. In high speed mode these states are reversed.

In this embodiment there are three one-way optical connections 101/311, 102/312, 103/313, from the peripheral transceiver 10 to the host transceiver 30, and three such connections 301/111, 302/112, 304/114 in the reverse direction. Each connection comprises an infra red LED 101, 102, 103, 301, 302, 304 in one transceiver and a corresponding photodiode 111, 112, 114, 311, 312, 313 in the other, making six optical connections in total.

Four of the optical connections are used to provide a pair of two-way optical links interrupting each data wire 191/391, 192/392 connecting the terminal 40 to equipment 20. Two infra-red LEDs 101, 102; (301, 302) are used in each transceiver, co-operating with two photodiodes 311, 312; (111, 112), which detect the signals sent by the LEDs in the corresponding transceiver. It is feasible to use a single LED in each transceiver, but this requires more complex drive circuitry and thus the dual LED option is preferred.

An infra-red link can be achieved by moving the two transceivers 10, 30 into alignment such that data can be transmitted between them. Disconnection can be achieved reliably by moving the transceivers 10, 30 out of close alignment, such that the photodiodes 111, 112, 311, 312 each detect a low logic signal, which is the USB signal for a disconnection. However, in the preferred embodiment a fifth infra red link is provided, comprising additional pulsed light source 103 in the peripheral transceiver 10, and a corresponding detector 313 is provided in the host transceiver 30, to avoid spurious signals from ambient light sources. The detector 313 provides an input to control logic 27 controlling the operation of the host transceiver 30.

In a standard USB link the peripheral (in this case the electronic device 20) identifies whether it is a low-speed or high-speed device by the presence of a resistance across one or other of the data wires 191, 192, and the USB host (in this case the terminal 40) determines whether the peripheral is a low-speed or high-speed device by comparing the voltages on the signalling wires 191, 192. The infra-red link is arranged to replicate this signal by arranging that the peripheral transceiver 10 connected to the peripheral device 20 identifies the connection 191, 192 to the which the resistor is connected, and generates an optical signal during an otherwise idle state of the link 101, 311; 102, 312, so that the corresponding host transceiver 30 can generate a voltage in the signal wires 391, 392 connecting the transceiver 30 to the terminal 40, thus replicating the conditions in the wires 191 192 connecting the peripheral transceiver 10 to the peripheral device 20.

As previously described with reference to FIG. 4, the connections between the transceivers 10, 30 cannot be simply connected in reverse parallel, but are arranged for half-duplex operation, in other words each direction must be switched out of use when the other is operating. This is achieved by means of switches 121, 122, 321, 322 controlled by respective switching units 12, 32 in the transceivers 10, 30. The switching unit 12 in the peripheral transceiver 10 is controlled by signals received from the switching unit 32 in the host transceiver 30 over a sixth optical link 304, 114. The fact that the system operates in differential mode makes it possible for the control unit 32 of the host transceiver 30 to monitor the inputs received from the LEDs 101, 102 of the other transceiver 10, (as shown by monitoring points 331, 332), and if incoming data is detected on either line then the transceiver 30 is set to receive that data. The USB protocol defines token packets, and these tokens determine the direction of the packets to follow, In essence, if an IN packet is sent from the host 40 then it is expecting data to be sent to it, so once the packet is completed the switches 121, 122, 321, 322 can be set for the incoming data. In the same fashion, if an OUT packet is sent then the next packets will be in the same direction so the switches are left as they are. The default condition is arranged such that the host 30 is always allowed to transmit and the peripheral 10 to receive. When a data packet received from peripheral 10 has terminated (upon detection of an EOP signal), the switches 121, 122, 321, 322 are re-set to the default condition.

Operation of the connection can be over-ridden if the detector 313 fails to detect the LED 103, Such a failure, caused by separation of the transceivers 10, 30 from each other, causes the control unit 32 to emulate a disconnection sequence .

The host terminal 40 and transceiver 30 can be incorporated into a payphone for use in public areas. The peripheral transceiver 10 can be connected to a personal computer 20 (preferably via a USB connection 11) so that users can connect from an internet café or similar location. The peripheral device transceiver 10 could be incorporated into the electronic device 20 but it is thought that it is preferable for the transceiver to be removable so that the user device 20 can be connected directly to a terminal 40 through a USB cable and connector when one is available.

Although the preceding discussion focuses on infra-red communication links, it will be understood that visible light, or radiation from the near ultra-violet region could be also be used for the communications link.

What is claimed is:

1. An optical transceiver, the transceiver comprising:
   means enabling an associated electronic device to transmit and receive data signals in a USB two channel format, and
   a pair of transmitter means to directly modulate the received USB two channel-format signals onto respective optical carriers, and a pair of receivers to extract USB two channel-format modulated signals from respective optical carriers.

2. A transceiver according to claim 1, further comprising:
   means for detecting a configuration of an electronic device to which it is connected, means for generating data in accordance with the detected configuration,
   means for detecting an idle period in the transmitted and received data signals, and
   means for transmitting the generated configuration data over the optical carriers during said idle period.

3. A transceiver according to claim 2, wherein the configuration data relates to the data rate at which the electronic device is to operate.

4. A transceiver according to claim 1, further comprising:
   means for detecting an idle period in the transmitted and received data signals,
   means for receiving configuration data over the optical carriers during said idle periods, and
   means for configuring the electronic device according to the configuration data.

5. A transceiver according to claim 1, further comprising transmission means for transmitting an alert signal to a co-operating transceiver.

6. A transceiver according to claim 5, wherein the transmission means is a pulsed light emitting diode.

7. A transceiver according to claim 1, further comprising:
   detection means for detecting an alert signal indicative that a co-operating transceiver is present.

8. A transceiver according to claim 7, wherein the detection means comprises an optical sensor.

9. A transceiver according to claim 1 arranged for time division duplex operation with a co-operating transceiver.

10. A transceiver according to claim 9, further comprising:
    means for transmitting a control signal for controlling operation of a co-operating transceiver,
    means for operating in receive mode for a predetermined period after transmission of the control signal,
    means for detecting signals received from the co-operating transceiver, and
    means for switching to transmit mode if no such signals are detected.

11. A transceiver according to claim 1, further comprising:
    means for connection to and disconnection from an associated electronic device.

12. A transceiver according to claim 11, wherein the connection is a wired connection operable in USB format.

13. A transceiver according to claim 1 wherein the optical transceiver is incorporated in a docking port for connection to a complementary docking port having a corresponding transceiver, the docking ports having alignment means arranged such that plural optical interfaces in one transceiver are aligned with respectively corresponding plural optical interfaces in a corresponding further transceiver so as to minimize interference between corresponding plural optical communication channels, and from external light sources.

14. An optical transceiver, the receiver comprising:
    means enabling an associated electronic device to transmit and receive data signals in a USB two channel format, and
    means to directly modulate the received USB-format signals onto a pair of optical carriers, and to extract USB two channel-format modulated signals from a pair of optical carriers,
    said transceiver being arranged for time division duplex operation with a co-operating transceiver;
    detection means for detecting a control signal from a co-operating transceiver, and
    means for putting the transceiver into transmit mode in response to the control signal.

15. An optical transceiver, the transceiver comprising:
    means enabling an associated electronic device to transmit and receive data signals in a USB two channel format, and
    means to directly modulate the received USB-format signals onto an optical carrier, and to extract USB-format modulated signals from an optical carrier;
    transmission means for transmitting an alert signal to a cooperating transceiver;
    wherein the transmission means comprises a pulsed light emitting diode;

three pairs of optical transmitters and sensors,
wherein two of the pairs are used for duplex operation in the two-channel USB format, and the third pair is used for exchange of the alert and control signals.

16. A communications terminal, the terminal comprising: a transceiver according to claim 1 and the associated electronic device.

17. A communications terminal according to claim 16, connected to a storage device by a communications network.

18. A communications terminal according to claim 16, further comprising means for processing payment for use of the terminal.

19. A communications terminal as in claim 16 wherein the optical transceiver is incorporated in a docking port for connection to a complementary docking port having a corresponding transceiver associated with alignment means arranged such that plural optical interfaces in one transceiver are aligned with respectively corresponding plural optical interfaces in a corresponding further transceiver so as to minimize interference between corresponding plural optical communication channels, and from external light sources.

20. A method for coupling a USB port of a first electronic device to a USB channel of a second electronic device via an optical communications link, said method comprising:
enabling an electronic device to each transmit and receive data signals in a USB two channel format by (a) modulating USB two channel-format signals onto a pair of optical carriers and (b) by extracting USB two channel-format modulated signals from a pair of optical carriers.

21. A method as in claim 20 further comprising harmonizing configurations of two coupled devices on the same USB data rate by:
detecting a configuration of a connected electronic device,
generating data in accordance with the detected configuration,
detecting an idle period in the transmitted and received data signals, and
transmitting the generated configuration data over the optical carriers during said idle period.

22. A method as in claim 21 wherein the configuration data relates to the data rate at which the electronic device is to operate.

23. A method as in claim 20 further comprising harmonizing configurations of two coupled devices on the same USB data rate by:
detecting an idle period in the transmitted and received data signals,
receiving configuration data over the optical carriers during said idle periods, and
configuring an electronic device according to the configuration data.

24. A method as in claim 20 further comprising transmitting an alert signal to a co-operating transceiver.

25. A method as in claim 20 further comprising:
detecting an alert signal indicative that a co-operating transceiver is present.

26. A method as in claim 20 using time division duplex operation with a co-operating transceiver.

27. A method as in claim 26 further comprising synchronizing duplex operation of the USB signals by:
transmitting a control signal for controlling operation of a co-operating transceiver,
operating in receiving mode for a predetermined period after transmission of the control signal,
detecting signals received from the co-operating transceiver, and
switching to transmit mode if no such signals are detected.

28. A method as in claim 26 further comprising synchronizing duplex operation of the USB signals by:
detecting a control signal from a co-operating transceiver, and
putting the transceiver into transmit mode in response to the control signal.

29. A method as in claim 20 further comprising:
incorporating said optical link in a docking port for connection to a complementary docking port having a corresponding transceiver associated with alignment means arranged such that plural optical interfaces in one transceiver are aligned with respectively corresponding plural optical interfaces in a corresponding further transceiver so as to minimize interference between corresponding plural optical communication channels, and from external light sources.

30. A method as in claim 20 further comprising connecting an optically linked electronic device to a storage device via communications network.

31. A method as in claim 20 further comprising:
processing payment for use of one of said electronic devices operating as a terminal for connection to a communications network.

32. A method for coupling a USB port of a first electronic device to a USB channel of a second electronic device via an optical communications link, said method comprising:
enabling an electronic device to each transmit and receive data signals in a USB two channel format by (a) modulating USB-format signals onto an optical carrier and (b) by extracting USB-format modulated signals from an optical carrier;
using three pairs of optical transmitters and sensors,
wherein two of the pairs are used for duplex operation in the two-channel USB format, and the third pair is used for exchange of alert and control signals.

* * * * *